(12) United States Patent
Minegishi et al.

(10) Patent No.: US 7,182,870 B2
(45) Date of Patent: Feb. 27, 2007

(54) HOLLOW FIBER MEMBRANE AND METHOD OF PRODUCING THE SAME

(75) Inventors: Shin-ichi Minegishi, Otsu (JP); Masahiro Henmi, Otsu (JP); Toshiyuki Ishizaki, Shiga (JP); Koichi Dan, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/155,602

(22) Filed: Jun. 20, 2005

(65) Prior Publication Data

US 2005/0258101 A1 Nov. 24, 2005

Related U.S. Application Data

(63) Continuation of application No. 10/256,200, filed on Sep. 27, 2002, now abandoned.

(30) Foreign Application Priority Data

Oct. 4, 2001 (JP) .................. 2001-308671
Oct. 4, 2001 (JP) .................. 2001-308672

(51) Int. Cl.
*B01D 63/02* (2006.01)
*B01D 63/06* (2006.01)
*B29C 44/50* (2006.01)
*D01D 5/247* (2006.01)

(52) U.S. Cl. .................. 210/500.23; 210/500.27; 210/500.42; 210/650; 264/209.1; 264/209.5

(58) Field of Classification Search .................. None
See application file for complete search history.

(56) References Cited

U.S. PATENT DOCUMENTS 5,013,339 A 5/1991 Mahoney et al.
5,022,990 A 6/1991 Doi et al.
5,032,331 A 7/1991 Onishi et al.
5,066,401 A 11/1991 Muller et al.
5,565,153 A 10/1996 Chidlaw et al.
6,013,688 A 1/2000 Pacheco et al.
6,024,872 A 2/2000 Mahendran et al.

(Continued)

FOREIGN PATENT DOCUMENTS

EP 0037836 A1 10/1981

(Continued)

OTHER PUBLICATIONS

P. van de Witte et al. (1996) "Phase Separation Process in Polymer Solutions in Relation to Membrane Formation," *Journal of Membrane Science* 117; pp. 1-31.

(Continued)

*Primary Examiner*—Krishnan S. Menon
(74) *Attorney, Agent, or Firm*—Morrison & Foerster LLP

(57) ABSTRACT

A method of producing a hollow fiber membrane includes discharging a polyvinylidene fluoride solution comprising a polyvinylidene fluoride resin and a poor solvent at a temperature above a phase separation temperature into a cooling bath at a temperature below the phase separation temperature to coagulate the polyvinylidene fluoride resin. The hollow fiber membrane comprises a polyvinylidene fluoride resin having spherical structures that have an average diameter in the range of 0.3 to 30 μm.

12 Claims, 5 Drawing Sheets

U.S. PATENT DOCUMENTS

2004/0135274 A1* 7/2004 Matsuda et al. ............ 264/28

FOREIGN PATENT DOCUMENTS

| EP | 1-230-970 A1 | 8/2002 |
|---|---|---|
| JP | 53-080378 | 7/1978 |
| JP | 56-136825 | 10/1981 |
| JP | 62-258711 | 11/1987 |
| JP | 63-172745 | 7/1988 |
| JP | 1-22003 | 4/1989 |
| JP | 2000-033241 | 2/2000 |
| WO | WO 9947593 A1 * | 9/1999 |
| WO | WO 01/28667 A1 | 4/2001 |

OTHER PUBLICATIONS

Supplementary Partial European Search Report directed to EP Application No. 02770214.

Hiatt et al., "Microporous Membranes via Upper Critical Temperature Phase Separation" Material Science of Synthetic Membranes, American Chemical Society Symposium Series 269, pp. 229-244, 1985.

Lloyd "Microporous Membrane Formation via Thermally Induced Phase Separation. I. solid-Liquid Phase Separation" Journal of Membrane Science, 52, pp. 239-261, 1990.

Australian Search Report mailed Mar. 10, 2004.

* cited by examiner

30 μm

HOLLOW FIBER MEMBRANE AND METHOD OF PRODUCING THE SAME

REFERENCE TO RELATED APPLICATION

This application is a continuation of Ser. No. 10/256,200, filed Sep. 27, 2002, now abandoned.

BACKGROUND OF THE INVENTION

1. Field of the Invention

The present invention relates to hollow fiber membranes and methods of producing the same. In particular, the present invention relates to a method of producing a hollow fiber microfiltration membrane and hollow fiber ultrafiltration membrane to be used in water treatments, such as drainage treatments, water purification treatments, and industrial water production, and relates to a hollow fiber membrane produced by the method.

2. Description of the Related Art

Separation membranes such as microfiltration membranes and ultrafiltration membranes have been used in various fields such as the food industry, medical treatment, water production, and waste water treatment. In recent years, separation membranes have also been used in drinking water production, namely, water purification treatment. In the water treatment such as water purification, a large volume of water must be treated; hence, hollow fiber membranes having a large effective filtration area per unit volume are generally used. An improvement in the water permeability of the hollow fiber membrane allows a reduction in membrane area and a reduction in manufacturing expense due to the reduced size. Such an improvement is also advantageous since exchanging membranes becomes more cost effective and the membranes require a smaller installation area.

Fungicides such as sodium hypochlorite are added for sterilizing permeated water and preventing biofouling of the membrane in some cases. Furthermore, the membranes are washed with acids such as hydrochloric acid, citric acid, and oxalic acid, alkalis such as sodium hydroxide, and surfactants, if necessary. Hence, polyvinylidene fluoride separation membranes having high chemical resistance have been used recently. In water treatment, contamination by chlorine-resistant pathogenic microorganisms such as *cryptosporidium* has become common in the last few years. Under such circumstances, hollow fiber membranes must have high tensile properties to prevent contamination by raw water caused by fracture of the membranes. The term "raw water" represents river water, lake water, ground water, seawater, waste water, discharged water, and treated water thereof.

Polyvinylidene fluoride separation membranes are prepared by the following methods: (1) A polyvinylidene fluoride solution (polyvinylidene fluoride dissolved in a good solvent) is extruded from a spinneret or cast onto a glass plate held at a temperature that is considerably lower than the melting point of the polyvinylidene fluoride, and the shaped resin is brought into contact with a liquid containing a nonsolvent to form a porous structure by phase separation induced by the nonsolvent (wet process disclosed in Japanese Examined Patent Application Publication No. 1-22003); and (2) inorganic particles and an organic liquid are mixed with melted polyvinylidene fluoride, and the mixture is extruded from a spinneret or molded with a molding press held at a temperature that is higher than the melting point of the polyvinylidene fluoride, the resultant extrudate is solidified by cooling, then the organic liquid and the inorganic particles are removed to form a porous structure (melt extraction process disclosed in Japanese Patent No. 2899903).

The wet process, however, exhibits unevenness in phase separation in the thickness direction that causes the formation of a membrane having an asymmetric structure containing macrovoids; hence, the membrane has insufficient mechanical strength. Furthermore, there are many production parameters on which the structure and the properties of the membrane depend; the production steps are not controllable and reproducible. The melt extraction process yields a relatively uniform, high-strength membrane with no macrovoids; however, poor dispersion of the inorganic particles can cause defects such as pinholes. Furthermore, the melt extraction process has a disadvantage of extremely high production cost.

SUMMARY OF THE INVENTION

An object of the present invention is to provide a hollow fiber membrane that is composed of a polyvinylidene fluoride resin having high chemical resistance and shows high mechanical strength and high water permeability.

Another object of the present invention is to provide a method of producing the hollow fiber membrane with reduced environmental load at low cost.

According to an aspect of the present invention, a method of producing a hollow fiber membrane includes discharging a polyvinylidene fluoride solution comprising a polyvinylidene fluoride resin and a poor solvent at a temperature above a phase separation temperature into a cooling bath at a temperature below the phase separation temperature to coagulate the polyvinylidene fluoride resin.

According to another aspect of the present invention, a hollow fiber membrane comprises a polyvinylidene fluoride resin having spherical structures that have an average diameter in the range of 0.3 to 30 μm.

According to another aspect of the present invention, a hollow fiber membrane module includes the above hollow fiber membrane.

According to another aspect of the present invention, a water separator includes the hollow fiber membrane module.

According to another aspect of the present invention, a method of producing permeated water from raw water uses the above water separator.

According to another aspect of the present invention, in a method of producing permeated water from raw water using a membrane comprising a polyvinylidene fluoride resin, the method comprises bringing the membrane into contact with chlorine in an amount corresponding to the organic content (natural organic matter content) in the raw water.

DESCRIPTION OF THE PREFERRED EMBODIMENTS

Figure 1:
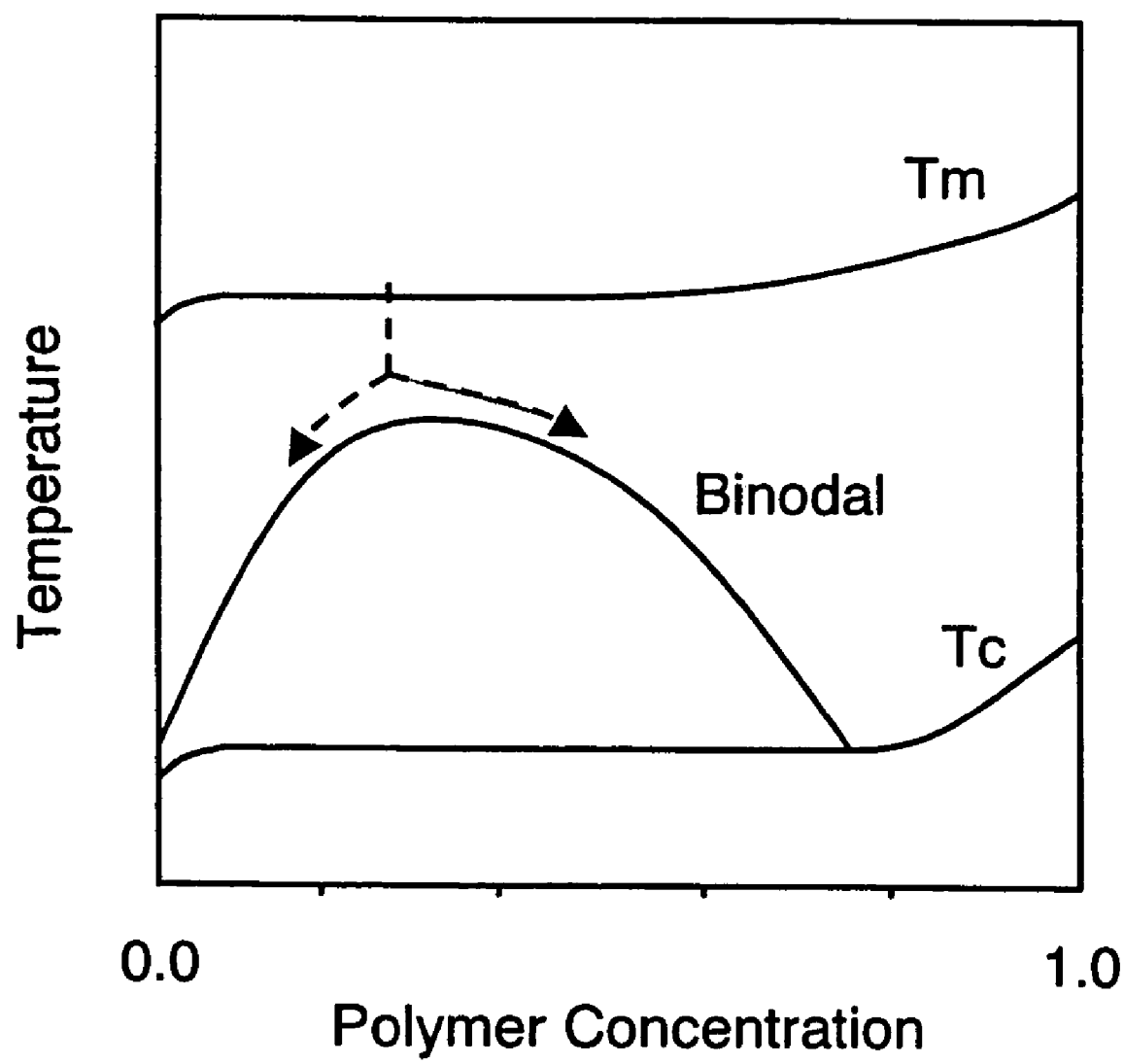
FIG. 1 is a phase diagram illustrating typical liquid-liquid phase separation.

Polyvinylidene fluoride resins in the present invention represent resins containing vinylidene fluoride homopolymer and/or vinylidene fluoride copolymer. The polyvinylidene fluoride resins may contain different types of vinylidene fluoride copolymer. The vinylidene fluoride copolymer has a vinylidene fluoride structural unit. Typical vinylidene fluoride copolymers are polymers of vinylidene fluoride monomer and fluorine-containing comonomers, such as vinyl fluoride, tetrafluoroethylene, hexafluoropropylene, and trifluorochloroethylene. These comonomers may be used alone or in combination. The vinylidene fluoride copolymer in the present invention may contain any other monomer such as ethylene as long as the copolymer exhibits the advantages in the present invention.

Poor solvents in the present invention represent liquids that cannot dissolve 5 percent by weight or more of polyvinylidene fluoride resin at a low temperature of less than 60° C. and can dissolve the resin at a high temperature in the range of 60° C. to the melting point of the resin (for example, about 178° C. for a vinylidene fluoride homopolymer resin). In the present invention, good solvents represent liquids that can dissolve 5 percent by weight or more of polyvinylidene fluoride resin at a low temperature of less than 60° C., and nonsolvents represent liquids that can neither dissolve nor swell the polyvinylidene fluoride resin at any temperature lower than the melting point of the polyvinylidene fluoride resin. Examples of poor solvents include medium-chain alkyl ketones, esters, glycol esters and organic carbonates, i.e., cyclohexanone, isophorone, γ-butylactone, methyl isoamyl ketone, dimethyl phthalate, propylene glycol methyl ether, propylene carbonate, diacetone alcohol, and glycerol triacetate. Among these, cyclohexanone, isophorone, γ-butylactone, and dimethyl phthalate are preferable. Cyclohexanone and γ-butylactone are more preferable. Examples of good solvents include lower alkyl ketones, esters, and amides, i.e., N-methyl-2-pyrrolidone, dimethyl sulfoxide, dimethyl acetamide, dimethyl formamide, methyl ethyl ketone, acetone, tetrahydrofuran, tetramethylurea, and trimethyl phosphate. Examples of nonsolvents include water; aliphatic, aromatic, and chlorinated hydrocarbons, i.e., hexane, pentane, benzene, toluene, methanol, carbon tetrachloride, and o-dichlorobenzene, trichloroethylene; hydroxyl-containing liquids, i.e., ethanol and low-molecular weight polyethylene glycol; and other chlorinated organic liquids.

In the present invention, the polyvinylidene fluoride resin is dissolved into a poor solvent at a temperature that is higher than a phase separation temperature, namely, 80° C. to 175° C., and preferably 100° C. to 170° C., to prepare a polyvinylidene fluoride resin solution. The weight of the polyvinylidene fluoride resin used is in the range of 20 to 60 percent by weight, and preferably 30 to 50 percent by weight. The tensile properties of the resulting hollow fiber membrane increase with the resin concentration; however, an excess resin content results in low porosity and thus low water permeability of the hollow fiber membrane. Furthermore, the viscosity of the polymer solution must be in a suitable range in order to prepare hollow fibers. For preparation of the polymer solution, different types of poor solvent may be used. The poor solvent may contain a good solvent, a nonsolvent, a nucleating agent, an antioxidant, a plasticizer, a molding aid, and a lubricant, as long as the polymer solubility does not change substantially. The mixture is agitated at an elevated temperature to prepare a polymer stock solution.

Meanwhile, in conventional wet processes, the polymer concentration is within the range of about 10 to 20 percent by weight for ensuring water permeability. No membrane having high tensile properties is obtainable from this range. In contrast, the above high polymer concentration in the present invention enables the hollow fiber membrane to have high tensile properties. In the present invention, the polymer solution is cooled from a temperature above the phase separation temperature in the range of 80° C. to 175° C. by cooling liquid or the like so that the polymer is coagulated. In this process, microspheric structures connect to each other to form a hollow fiber membrane having pores. The microspheric structure is assumed to be spherulitic. Spherulites in this process are formed by spherical porous precipitates of the polyvinylidene fluoride resin from the polyvinylidene fluoride solution by phase separation. A hollow fiber membrane prepared by this process has higher mechanical strength and water permeability than that having a network structure obtained by any conventional wet process.

Since a high-concentration polymer solution in a poor solvent exhibits a large change in viscosity with temperature, the formation of a hollow fiber membrane from the solution is generally difficult. If the viscosity of the polymer solution is significantly low, the polymer component cannot continuously coagulate in a drying unit or a cooling bath and no hollow fiber membrane is obtainable. If the viscosity is significantly high, the polymer solution is not smoothly discharged from the spinneret and no hollow fiber membrane is obtainable. In the present invention, the spherical structure is controlled by a combination of a specific temperature range of the polymer solution and a cooling process. Specifically, (1) if the temperature of the polymer solution is significantly low, gelation or solidification occurs before the development of spherical structures and thus no porous structure having water permeability is formed; and (2) if the temperature is significantly high, long time is required for cooling, gelation, and solidification. In this case, large spherical structures are formed and polymer molecule aggregates that bond these spherical structures decrease. Thus, the membrane structure exhibits low mechanical strength. The present invention is accomplished based on these results. The principle of the present invention will now be described in detail.

Phase separation processes for producing porous membranes are categorized into a nonsolvent-induced phase separation process that induces phase separation by contact with the nonsolvent and a thermally-induced phase separation process that induces phase separation by a change in temperature. The thermally-induced phase separation process primarily utilizes one of the following two separation mechanisms; liquid-liquid phase separation and solid-liquid phase separation. In the liquid-liquid phase separation, a homogeneous polymer solution at a high temperature is separated into a concentrated polymer phase and a diluted polymer phase by a decrease in solubility during a cooling step. In the solid-liquid phase separation, a homogeneous polymer solution at a high temperature is separated into a solid polymer phase formed by crystallization of the polymer and a diluted polymer solution phase during a cooling step (Journal of Membrane Science 117 (1996), pp. 1–31). The mechanism is determined by the phase state of the polymer solution.

FIG. 1 is a phase diagram of a typical liquid-liquid phase separation. In the present invention, the melting point Tm (° C.) and the crystallization temperature Tc (° C.) of the stock solution are determined at a heating/cooling rate of 10° C./min by differential scanning calorimetry (DSC), unless otherwise specified. A binodal curve is obtained by plotting the phase separation temperatures that are determined by measuring clouding points. In the liquid-liquid phase separation, the binodal curve lies at a higher-temperature side than the crystallization curve. The polymer solution is gradually cooled from the melting point. When the polymer solution reaches any temperature on the binodal curve, the solution is separated into a concentrated polymer phase and a diluted polymer phase. The phase separation continues until the solution reaches the crystallization temperature. The final porous structure after removing the solvent is a matrix structure (sea-island structure), although the structure depends on the composition of the polymer solution and the cooling rate.

Figure 2:
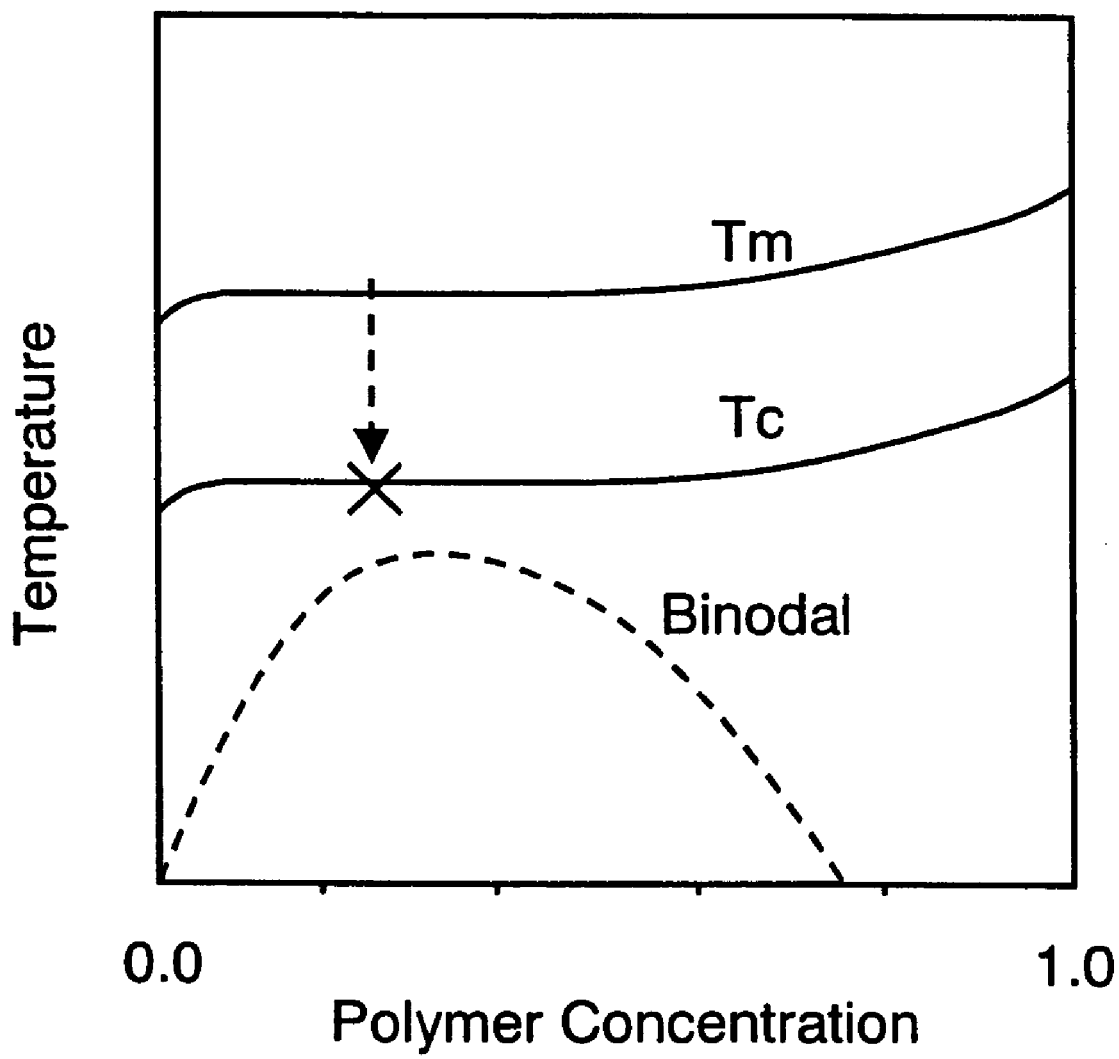
FIG. 2 is a phase diagram illustrating typical solid-liquid phase separation.

FIG. 2 is a phase diagram of a typical solid-liquid phase separation. In this mode, the crystallization curve lies at a higher-temperature side than the binodal curve. The polymer solution is gradually cooled from the melting point. When the polymer solution reaches any temperature on the crystallization curve, crystallization of the polymer occurs. During a further cooling step, the polymer crystals grow. The final porous structure after removing the solvent is a spherulite structure, although the structure depends on the composition of the polymer solution and the cooling rate.

For example, any polyvinylidene fluoride/poor solvent system causes the solid-liquid phase separation. In the phase diagram of this system, the binodal curve lies below the crystallization curve and is not observed. The relative position of the binodal curve shifts towards the high-temperature side as the affinity of the solvent to the polymer decreases. In this system, no solvent showing liquid-liquid phase separation is known.

In the present invention, the crystallization temperature Tc is defined as follows: A mixture of a polyvinylidene fluoride resin and a solvent, the mixture having the same composition as that of a polymer stock solution for producing a membrane, is sealed into a DSC cell. The DSC cell is heated at a heating rate of 10° C./min to a dissolution temperature in a DSC apparatus, is held at the dissolution temperature for 5 minutes, and is cooled at a cooling temperature of 10° C./min. The rising temperature of the crystallization peak of the DSC curve in the cooling stage is defined as the crystallization temperature Tc (see FIG. 3).

The inventors have found that the crystallization temperature of the polymer solution is highly related to the membrane structure formed by the thermally induced phase separation. The present invention is characterized in that the crystallization temperature Tc of the polymer solution is in the range of 40° C. to 120° C. In other words, the conditions for forming the membrane are controlled so that the crystallization temperature becomes higher. Thus, the membrane structure, namely, the spherulite size can be miniaturized. A membrane having a fine structure exhibits high separability. Conditions affecting the crystallization temperature of the stock solution are, for example, the polymer concentration, types of polymer (molecular weight, shape of the branch, type of copolymer), the type of solvent, and additives affecting the crystallization. For example, with increasing polymer concentration, the crystallization temperature Tc increases while the spherulite size decreases. The inventors have also found that the spherulite size decreases as the crystallization temperature Tc increases. Furthermore, the inventors have found that the spherulite size increases as the molecular weight of the polymer increases. The crystallization temperature Tc is less correlated with the molecular weight, but is affected by the type of polymer (homopolymer or copolymer) and the shape of the branch. With substantially the same molecular weight, the spherulite size tends to decrease when a polymer solution having a higher crystallization temperature Tc, which is determined by the shape of the branch and the type of copolymer, is used.

In the present invention, the type of polymer is preferably selected so as to increase the polymer concentration and the crystallization temperature Tc of the polymer solution. Furthermore, the polymer stock solution preferably contains additives that can shift the crystallization temperature Tc of the stock solution, such as organic and inorganic salts.

The results of X-ray diffractometry show the formation of the spherulite structure. The formation of the spherulites is an exothermic reaction. In general, crystals that are first formed during the crystallization of polymers such as polyvinylidene fluoride resin are called primary nuclei. The primary nuclei grow into spherulites. If the formation rate of the primary nuclei is low, heat generated in the growth of the primary nuclei inhibits further formation of primary nuclei and facilitates further growth of the generated primary nuclei. The crystal growth continues until the spherulites collide with each other. Since the crystal growth is terminated by collision, the final spherulite size depends on the number of the primary nuclei generated first. In a polymer solution having a high crystallization temperature Tc, the crystallization readily proceeds, and the resulting spherulite size is reduced by the formation of many primary nuclei. In contrast, in a polymer solution having a low crystallization temperature Tc, the crystallization is inhibited, and the resulting spherulite size increases by the formation of relatively small primary nuclei.

The crystallization temperature Tc of the polymer solution is preferably in the range of 40° C. to 120° C., more preferably 45° C. to 105° C., and most preferably 48° C. to 95° C. A crystallization temperature Tc of less than 40° C. does not cause the formation of a fine membrane structure. A crystallization temperature exceeding 120° C. causes crystallization of the polymer in the polymer solution; hence, equipment for forming the membrane, such as a dissolver and pipes, must be controlled at high temperatures, resulting in energy loss. Furthermore, the solution must be rapidly cooled from a high temperature to a crystallization temperature. In addition, the polymer concentration must be high otherwise a high-porosity membrane cannot be obtained.

As described above, the polyvinylidene fluoride resin concentration in the polymer solution is preferably in the range of 20 to 60 percent by weight and more preferably 30 to 50 percent by weight, in view of compatibility between the mechanical strength and water permeability of the hollow fiber membrane, and formability into the hollow fiber membrane. A polymer concentration of less than 20 percent by weight causes a decrease in the crystallization temperature Tc of the polymer solution. Such a decrease inhibits the formation of a fine membrane structure. A polyvinylidene fluoride resin concentration in the range of 30 to 60 percent by weight facilitates production of a membrane having high permeability and a fine membrane structure.

The weight average molecular weight of the polyvinylidene fluoride resin in the stock solution is preferably at least $2 \times 10^5$. A weight average molecular weight of less than $2 \times 10^5$ leads to low viscosity of the solution that impairs formability of the membrane and a decrease in the mechanical strength of the membrane. A polymer having a high molecular weight causes an increase in viscosity of the solution, which inhibits the crystal growth. As a result, many spherulite nuclei, which are beneficial in the formation of a fine structure, are formed. More preferably, the weight average molecular weight of the polyvinylidene fluoride resin is in the range of $3 \times 10^5$ to $3 \times 10^6$.

In the present invention, the polymer solution is discharged from a double pipe spinneret to form a hollow fiber membrane, and the hollow fiber membrane is cooled to obtain a gel product. The spinneret temperature Ts (° C.) in the present invention represents the temperature of the bottom surface of the spinneret that discharges the polymer solution. In the present invention, the spinneret temperature Ts is controlled so as to satisfy the relationship $Tc \leq Ts \leq Tc+90$, preferably $Tc+10 \leq Ts \leq Tc+85$, and more preferably $Tc+20 \leq Ts \leq Tc+80$. The crystallization temperature Tc is preferably as low as possible for cooling efficiency; however, an excessively low crystallization temperature Tc impairs the formability of the membrane. If the spinneret temperature Ts is lower than the crystallization temperature Tc, the polymer is crystallized at the spinneret and cannot be satisfactorily discharged. If the spinneret temperature Ts is larger than the crystallization temperature Tc+90° C., the resulting membrane retaining heat is insufficiently cooled during the cooling step and a fine membrane structure is not obtained. For example, the polymer solution is discharged through a double pipe spinneret for spinning a hollow fiber membrane, and the spun hollow fiber membrane is introduced to a drying section having a predetermined length and to a cooling bath to coagulate the hollow fiber membrane. Before the polymer solution is discharged from the spinneret, the polymer solution is preferably filtered through a 5 to 100 μm stainless-steel filter. The dimensions of the spinneret are determined in view of the size and structure of the hollow fiber membrane. Preferably, the spinneret has a slit outer diameter of 0.7 to 10 mm, a slit inner diameter of 0.5 to 4 mm, and an injection pipe of 0.25 to 2 mm. The spinning draft (the drawing rate to the linear discharged rate of the stock solution at the spinneret) is preferably in the range of 0.8 to 100, more preferably 0.9 to 50, and most preferably 1 to 30, and the distance between the spinneret surface and the cooling bath surface is preferably in the range of 10 to 1,000 mm. The spinneret temperature Ts may be different from the dissolution temperature. Preferably, the dissolution temperature is higher than the spinneret temperature Ts for rapidly completing uniform dissolution. The hollow fiber polymer is coagulated into a hollow fiber membrane, as described above. Preferably, the coagulation bath containing a poor solvent has a temperature in the range of 0° C. to 50° C. and more preferably 5° C. to 30° C. and a poor solvent concentration in the range of 60 to 100 percent by weight and more preferably 75 to 90 percent by weight. The coagulation bath may contain two or more poor solvents in combination. Furthermore, the coagulation bath may contain any good solvent and nonsolvent within the above poor solvent concentration. Rapid cooling with a large temperature difference between the polymer solution temperature and the polymer dissolution temperature facilitates the formation of fine spherulite structures that are bonded by the coagulated polymer, forming a membrane structure having high permeability and high tensile properties. A poor solvent contained in the cooling bath at a considerably high concentration suppresses nonsolvent-induced phase separation, and the resulting hollow fiber membrane does not have a dense layer on the surface. If the cooling bath contains a high concentration of nonsolvent such as water, the resulting membrane has a dense surface layer and does not exhibit water permeability even after the membrane is stretched.

In general, for the formation of the hollow sections in the hollow fiber membrane, the polymer solution is discharged while gas or liquid is being supplied into the hollow section of the inner tube of the spinneret. In the present invention, a hollow section-forming liquid containing 60 to 100 percent by weight of a poor solvent is preferably supplied. In the hollow section-forming liquid, the content of the poor solvent is more preferably in the range of 70 to 100 percent by weight and most preferably 80 to 100 percent by weight. The liquid containing a high amount of poor solvent suppresses nonsolvent-induced phase separation and facilitates the formation of fine spherical structures. Different poor solvents may be used in combination. The liquid may contain small amounts of a good solvent and/or nonsolvent within the above range.

The cooling bath and the hollow section-forming liquid may be the same or different, and may be appropriately selected according to the target properties of the hollow fiber membrane. If the same poor solvent is used in the polymer solution, the cooling bath, and the hollow section-forming liquid, the poor solvent can be easily recovered. Any vessel may be used for containing the cooling bath. The cooling bath may be circulated or renewed while the composition and temperature are being controlled. Alternatively, a cooling liquid may be circulated in a pipe in which the hollow fiber membrane travels, or may be sprayed onto the hollow fiber membrane that travels through air.

In the present invention, the polymer solution is cooled at an average cooling rate Vt in the range of $2 \times 10^{3}$° C./min to $10^{6}$° C./min when the polymer solution is cooled to the crystallization temperature Tc. The average cooling rate Vt is preferably in the range of $5 \times 10^{3}$° C./min to $6 \times 10^{5}$° C./min and more preferably $10^{4}$° C./min to $3 \times 10^{5}$° C./min. As a result of phase separation at the above average cooling rate Vt, the hollow fiber membrane has a finer structure. The average cooling rate Vt during the formation of the membrane in the present invention is determined by either of the following methods (a) and (b): Case (a): the temperature of the cooled polymer solution reaches the crystallization temperature Tc in air.

$$Vt=(Ts-Tc)/t(sc)$$

wherein Ts is the temperature (° C.) of the spinneret, Tc is the crystallization temperature (° C.), and t(sc) is the elapsed time from discharging the stock solution to reaching the crystallization temperature Tc.

For the determination of the elapsed time t(sc), the time to reach the crystallization temperature Tc in air can be measured, for example, by thermography, and the elapsed time t(sc) is calculated from the distance from the spinneret to a point when the solution reaches the crystallization temperature Tc and the spinning rate. Case (b): the temperature of the cooled polymer solution reaches the crystallization temperature Tc in the cooling bath.

$$Vt=(Ts-Ta)/t(sa)$$

wherein Ts is the temperature (° C.) of the spinneret, Ta is the temperature (° C.) of the cooling bath, and t(sa) is the elapsed time from discharging the stock solution to reaching the temperature of the cooling bath.

In the measurement of the elapsed time t(sa), the polymer solution is assumed to reach the temperature of the cooling bath immediately after the polymer solution is dipped into the cooling bath. Thus, the elapsed time t(sa) can be calculated from the distance from the spinneret to the cooling bath and the forming rate of the membrane.

An average cooling rate of less than $2 \times 10^{3}$° C./min inevitably causes the formation of large structures that do not show satisfactory permeability. An average cooling rate exceeding $10^{6}$° C./min requires a significantly high cooling rate. When the polymer solution is cooled at such a high cooling rate in the cooling bath, discharge and cooling are unstable and the resulting membrane does not always show satisfactory properties.

The reason for a fine structure being obtained by a high cooling rate when the temperature of the cooled polymer solution reaches the crystallization temperature Tc is as follows: Heat generated by the formation of primary nuclei during the cooling step is removed by rapid cooling; crystal growth is inhibited and many primary nuclei suitable for forming fine structures are simultaneously formed.

The finely porous membrane obtained by the above method has a structure of fine bonded spherulites and pores therebetween. This membrane has higher mechanical strength, higher water permeability, and higher separability than conventional fine porous membranes.

The cooled gel membrane is dipped into an extraction solvent or is dried to remove the solvent from the membrane. A porous membrane is thereby prepared. The porous membrane may be drawn to increase porosity and to decrease the pore diameter due to elongation or tearing at the interfaces between the spherulites, and to enhance the mechanical strength due to orientation of the membrane. For obtaining a hollow fiber membrane having higher water permeability, the drawing temperature is preferably in the range of 50° C. to 140° C., more preferably 55° C. to 120° C., and most preferably 60° C. to 100° C., while the drawing ratio is preferably in the range of 1.1 to 5 times, more preferably 1.1 to 4 times, and most preferably 1.1 to 3 times. The porous membrane cannot be uniformly drawn at a temperature below 50° C. and will be structurally damaged at weak portions. However, parts of the spherical structures and the polymer molecules connecting the spherical structures are uniformly drawn at a temperature in the range of 50° C. to 140° C. As a result, many fine long pores having high stretch properties and water permeability are formed. If the membrane is drawn at a temperature exceeding 140° C., which is near the melting point of the polyvinylidene fluoride resin, the spherical structures are melted and the formation of fine pores is inhibited. Thus, the water permeability is not improved. Preferably, drawing is performed in a liquid because of ease of temperature control; however, drawing may be performed in gas such as steam. The liquid is preferably water. In drawing at a temperature of 90° C. or more, low-molecular weight polyethylene glycol may be used instead of water. Alternatively, drawing may be performed in a mixture of different liquids, for example, water and polyethylene glycol.

If such drawing is not employed, water permeability is low but filtration properties are improved compared with that of the drawn membrane. Thus, drawing may be employed depending on the desired application of the hollow fiber membrane.

Figure 4:
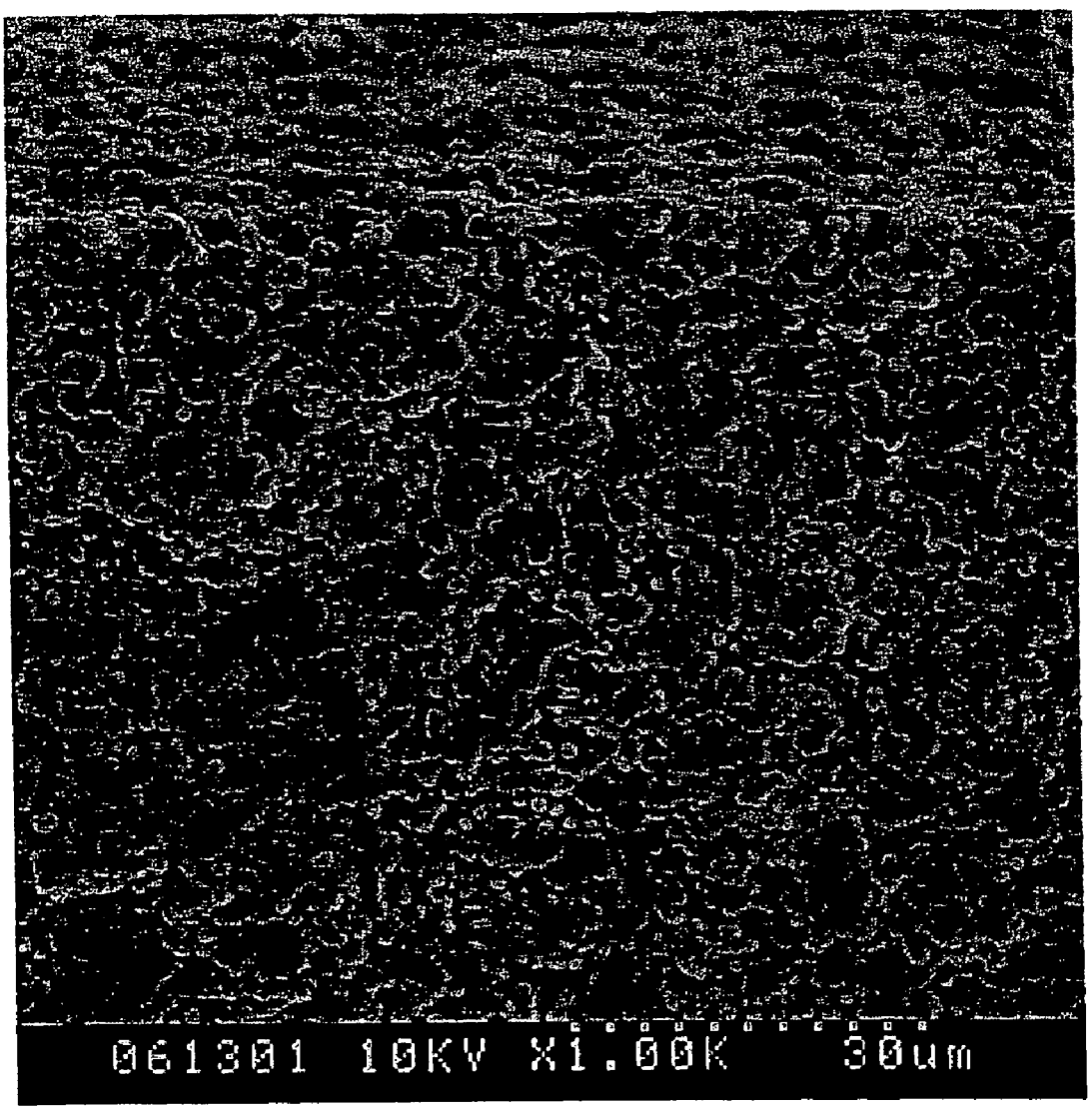
FIG. 4 is an electron micrograph of a cross-section of a hollow fiber membrane according to the present invention.

FIG. 4 is an electron micrograph of a cross-section of the hollow fiber membrane according to the present invention.

The hollow fiber membrane has spherical structures having an average diameter in the range of 0.3 to 30 μm, preferably 0.5 to 20 μm, and more preferably 0.8 to 10 μm. In particular, it is preferable that the interior of the hollow fiber membrane has spherical structures. In the interior, the spherical structures are bonded and have pores therebetween. Thus, the mechanical strength and water permeability are higher than those of conventional network structures. Here, the interior includes the substantial inner portion and/or the inner surface of the hollow fiber membrane but excludes the outer surface. The diameter of the spherical structures is determined by averaging the diameters of at least 10, and preferably at least 20 spherical structures selected at random in a scanning electron micrograph at a magnification that can clearly observe a cross section and/or an inner surface of the hollow fiber membrane. Preferably, the photograph may be analyzed using an image analyzer to determine equivalent circular diameters of the images. The density of the spherical structure is preferably in the range of $10^{3}$ to $10^{8}$/mm$^{2}$ and more preferably $10^{4}$ to $10^{6}$/mm$^{2}$. The density is determined by counting the number of spherical structures in a unit area in the micrograph. The spherical structures are substantially spherical or oval, and the circularity (short diameter/long diameter) is preferably at least 0.5, more preferably at least 0.6, and most preferably at least 0.7.

Preferably, the hollow fiber membrane according to the present invention has fine pores having an average diameter in the range of 0.01 to 20 μm, more preferably 0.01 to 10 μm, and most preferably 0.01 to 5 μm in the outer surface. The pores in the outer surface may have any suitable shape. The average of the equivalent circular diameters of these pores is preferably determined from the photograph using an image analyzer. Alternatively, the average of the equivalent circular diameters may be determined by averaging the short diameter and long diameter averages of the observed pores.

The spherical structure is preferably observed at the inner portion of a cut section of the hollow fiber membrane.

The outer diameter and the thickness of the hollow fiber membrane may be determined depending on the target volume of the permeable water in a membrane module, in view of the pressure loss in the longitudinal direction inside the hollow fiber membrane, as long as the hollow fiber membrane has predetermined mechanical strength. A larger outer diameter is advantageous for pressure loss but disadvantageous for the membrane area due to a reduction in the number of packed hollow fiber membranes. In contrast, a smaller outer diameter is advantageous for the membrane area due to an increase in the number of packed membranes but disadvantageous for pressure loss. A smaller thickness is preferable as long as the mechanical strength is maintained. Accordingly, the outer diameter of the hollow fiber membrane is preferably in the range of 0.3 to 3 mm, more preferably 0.4 to 2.5 mm, and most preferably 0.5 to 2 mm. The thickness is preferably 0.08 to 0.4 times, more preferably 0.1 to 0.35 times, and most preferably 0.12 to 0.3 times the outer diameter.

It is preferable that the hollow fiber membrane of the present invention does not substantially have macrovoids. Here, "macrovoids" represent voids having a diameter of 50 μm or more. In the present invention, the number of macrovoids is preferably 102/mm$^{2}$ and more preferably 5/mm$^{2}$ and most preferably zero.

Preferably, the hollow fiber membrane of the present invention has a water permeability in the range of 0.1 to 10 m$^{3}$/m$^{2}$·hr, more preferably 0.5 to 9 m$^{3}$/m$^{2}$·hr, and most preferably 1 to 8 m$^{3}$/m$^{2}$·hr at 100 kPa and 25° C., has a tensile strength in the range of 0.3 to 3 kg per fiber, more preferably 0.4 to 2.5 kg per fiber, and most preferably 0.5 to 2 kg per fiber, and has an elongation at break in the range of 20% to 1,000%, more preferably 40% to 800%, and most preferably 60% to 500%. A hollow fiber membrane satisfying these ranges exhibits high water permeability without being damaged under usual operating conditions.

In the hollow fiber membrane of the present invention, the polyvinylidene fluoride main chain preferably has hydrophilic functional-groups. The hydrophobic polyvinylidene fluoride resin easily traps contaminants in water, resulting in decreased water permeability. Furthermore, the trapped contaminants cannot be easily removed by washing. Introduction of the hydrophilic groups prevents the trapping of the contaminants and facilitates their removal by washing. As a result, the filtration membrane has a prolonged operation life. Examples of hydrophilic groups are hydroxyl, amino, and carboxyl. These hydrophilic groups may be introduced alone or in combination. Since introduction of a large number of hydrophilic groups decreases the mechanical strength of the hollow fiber membrane, a small number that cannot be determined by general analytical methods is introduced on the inner and outer surfaces and the surfaces of the porous structures of the hollow fiber membrane. However, the introduction of the hydrophilic groups can be evaluated by an increase in the water penetration rate.

The hydrophilic functional groups can be introduced by any known process. Examples of methods for introducing hydroxyl groups are a reaction of a polyoxyalkylene having hydroxyl end groups in the presence of base disclosed in Japanese Unexamined Patent Application Publication No. 53-80378; a chemical treatment in a strong alkaline solution containing an oxidizing agent disclosed in Japanese Unexamined Patent Application Publication No. 63-172745; and grafting of a monomer containing a neutral hydroxyl group disclosed in Japanese Unexamined Patent Application Publication No. 62-258711. A more preferred method in the present invention is dehydrofluorination of a hollow fiber membrane in an aqueous alkaline solution and then treatment of the membrane in an aqueous solution containing an oxidizing agent. This method has an advantage in that the process can be performed in a diluted alkaline solution and a diluted oxidizing agent solution, whereas the method disclosed in Japanese Unexamined Patent Application Publication No. 63-172745, which uses an oxidizing agent in the presence of strong alkaline, requires a large amount of strong oxidizing agent, i.e., permanganate or bichromate, and treatment of waste water containing heavy metal ions, although hydroxyl groups are infallibly introduced. Specifically, the dehydrofluorination method can be achieved in a 0.001- to 1-N aqueous alkaline solution in combination with hydrogen oxide or hypochlorite as the oxidizing agent. Examples of usable alkalis are inorganic hydroxides, i.e. sodium hydroxide and potassium hydroxide, and tertiary amines such as triethylamine. Alternatively, the hollow fiber membrane may be treated with an alkali followed by oxidation in ozone-containing water, as is disclosed in Japanese Unexamined Patent Application Publication No. 5-317663.

Examples of reactions for introducing amino groups are reaction of compounds containing primary or secondary amino groups disclosed in Japanese Unexamined Patent Application Publication Nos. 59-169512 and 1-224002.

An example of reactions for introducing carboxy groups is grafting a carboxyl-containing monomer.

Preferably, the hollow fiber membrane is immersed into an alcohol or aqueous alcohol before the introduction of the hydrophilic functional groups in order to introduce these groups homogeneously. Examples of alcohols are methanol, ethanol, 1-propanol, 2-propanol, 1-butanol, 2-butanol, isobutyl alcohol, and t-butyl alcohol. The alcohol content in the aqueous alcohol is preferably at least 10 percent by weight, more preferably at least 20 percent by weight, and most preferably at least 30 percent by weight.

The hollow fiber membrane produced by the above method may be used in hollow fiber membrane modules that collect permeated water. One type of module is a cylindrical container containing a bundle of hollow fiber membranes, an end or two ends of the bundle being fixed with an epoxy resin or the like. Another type of module includes hollow fiber membranes arranged in a flat plate, two ends of the hollow fiber membranes being fixed. The hollow fiber membrane module is generally provided with a compression means, i.e., a pump or a difference in water level, at an end for supplying raw water, or a suction means, i.e., a pump or siphon at the other end for collecting the permeated water. The hollow fiber microfiltration membrane is thereby used as a water separating apparatus that produces purified permeated water from raw water by membrane filtration. The term "raw water" represents river water, lake water, ground water, seawater, waste water, discharged water, and treated water thereof.

In the method for making permeated water from raw water using the membrane comprising the polyvinylidene fluoride resin, the membrane is preferably brought into contact with chlorine in an amount corresponding to the organic content in the raw water. The inventors found that the polyvinylidene fluoride membrane must be brought into contact with chlorine at a prescribed time interval during the filtration operation to ensure normal operation. The inventors also found that the amount of chlorine in contact with the membrane is closely connected to the organic content in the supplied raw water. It is known that natural organic matter such as fumic substances in raw water function as fouling substances for membranes (Water Science and Technology: Water Supply Vol. 1, No. 4, pp. 40–56). Chlorine is believed to prevent trapping of the organic matter on the membrane, decompose the trapped organic matter, and facilitate detachment of the trapped organic matter from the membrane. In particular, the hydrophobic polyvinylidene fluoride resin membrane easily causes fouling compared with hydrophilic membranes. Thus, the above chlorine treatment is effective for preventing fouling of the membrane. In the membrane having spherical structures according to the present invention, fouling will easily occur on the uneven surface and micropores; thus, such chlorine treatment is effective for preventing fouling. However, an excess amount of chlorine causes economic and health problems such as formation of trihalomethanes, although it ensures stable operation. Hence, the chlorine content is preferably a minimum corresponding to the organic content in the raw water.

In the present invention, the organic content in the water may be determined by various processes, such as total organic carbon (TOC), chemical oxygen demand (COD), biochemical oxygen demand (BOD), potassium permanganate consumption, and UV absorbance at 260 nm. Among these, highly precise and convenient TOC is preferred. The amount of chlorine dosing C (mg/l·min) is 0.01 to 10 times and preferably 0.03 to 5 times the TOC (mg/l) in the raw water supplied for each minute. The TOC represents an average TOC in the raw water and is determined by a statistical method in view of seasonal and daily variations. Chlorine can be brought into contact with the membrane by various methods: (1) continuously adding a constant concentration of chlorine to the supplied raw water; (2) intermittently adding a constant concentration of chlorine to the supplied raw water; (3) adding a variable concentration of chlorine in response to a variation in water quality; (4) adding a constant concentration of chlorine to back washing water so that the membrane is brought into contact with chlorine only during back washing operations; (5) adding a constant concentration of chlorine to back washing water for every several back washing operations; and (6) any combination of methods (1) to (5). Methods (1), (2), (4), a combination of methods (1) and (4), and a combination of methods (2) and (4) are preferred because of their simple operation and significant effect of the added chlorine. In the intermittent addition and the back washing addition, the contact amount of chlorine may be an average concentration within a prescribed time. An aqueous sodium hypochlorite, which can be handled easily and is inexpensive, is the most preferable source for generating chlorine in the present invention. Calcium hypochlorite, chlorine gas, and liquefied chlorine may also be used.

EXAMPLES

The present invention will now be described by nonlimiting EXAMPLES.

The parameters used in the present invention were measured as follows:

(1) Melting Point Tm and Crystallization Temperature Tc

Figure 3:
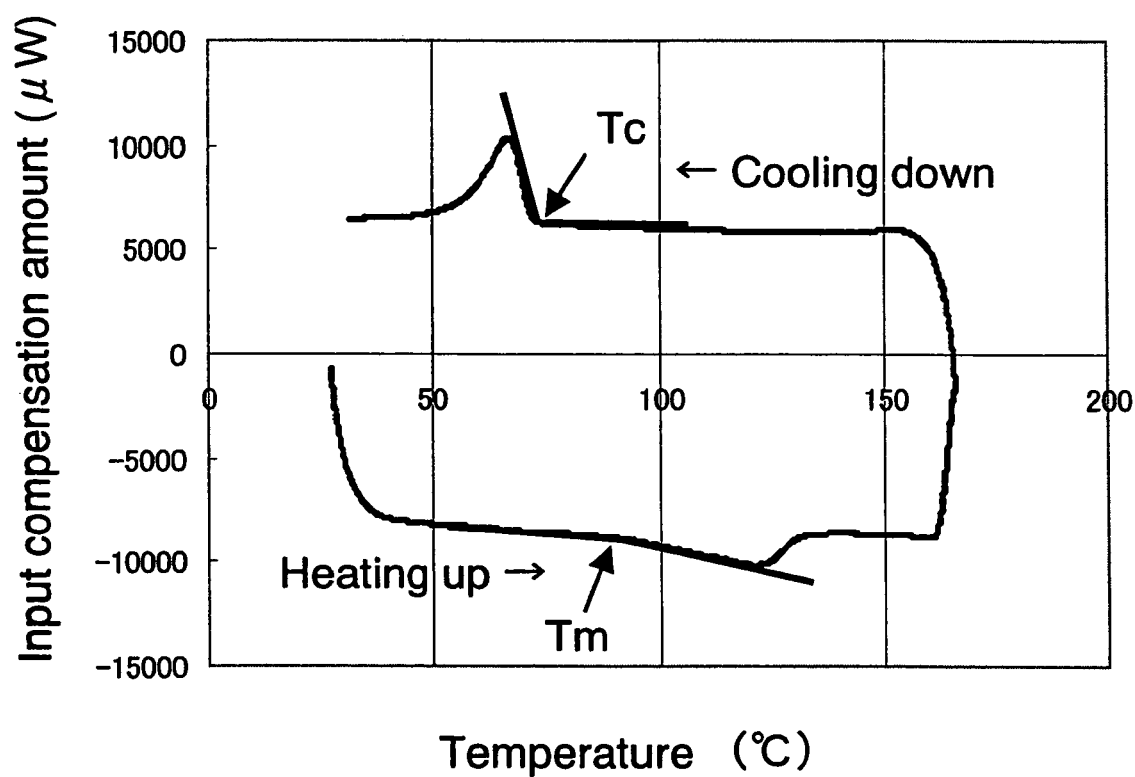
FIG. 3 is a thermogram of a polymer solution heated at a heating rate of 10° C./min to a dissolution temperature, held at the dissolution temperature for 5 minutes, and cooled at a cooling rate of 10° C./min in a differential scanning calorimeter.

A mixture of a polyvinylidene fluoride resin and a solvent, the mixture having the same composition as that of a polymer stock solution for producing a membrane, was sealed into a DSC cell. The DSC cell was heated at a heating rate of 10° C./min using a DSC-6200 made by Seiko Instruments Inc. The starting temperature of a melting peak observed in the heating step was defined as a uniform melting temperature Tm. The DSC cell was maintained at a dissolution temperature for 5 minutes and was cooled at a cooling rate of 10° C./min. The rising temperature of the crystallization peak observed during the cooling step was defined as the crystallization temperature Tc (FIG. 3).

(2) Clouding Point

The above mixture was sealed with a preparat, a cover glass, and grease. The specimen was heated to a dissolution temperature and was maintained at the temperature for 5 minutes using a cooling and heating unit LK-600 made by Japan Hightech for microscopes to dissolve the polyvinylidene fluoride resin. The specimen was cooled at a cooling rate of 10° C./min. The clouding temperature observed during the cooling step was defined as the clouding point.

(3) Average Cooling Rate Vt

The average cooling rate Vt was calculated using the following equation according to Case (b) above (the temperature of the cooled polymer solution reached the crystallization temperature Tc in the cooling bath), unless otherwise specified:

$$Vt=(Ts-Ta)/(\text{dry distance/extruding rate of polymer solution})$$

wherein Ts is the temperature (° C.) of the spinneret, Ta is the temperature (° C.) of the cooling bath, and the dry distance represents the distance between the spinneret surface and the cooling bath surface.

(4) Permeability

Reverse osmosis membrane treated water at 25° C. was fed into compact hollow fiber membrane modules (length: about 20 cm, number of hollow fiber membranes: 1 to 10) by a driving force of differential pressure corresponding to a 1.5 m difference in water level to measure the volume of the permeated water for a prescribed time. The volume was converted into that for a pressure of 100 kPa.

(5) Rejection of Polystyrene Latex

A water composition of reverse osmosis membrane treated water and Seradyn uniform latex particles having a particle size of 0.309 μm was subjected to cross-flow filtration at a supply pressure of 3 kPa and an average linear supply rate of 20 cm/s per area to obtain permeated water. The polystyrene latex concentrations of the supplied water and the permeated water that was collected 30 minutes after starting the filtration were determined with a UV-visible light spectrophotometer. The Rejection Rej (%) was determined by the following equation:

$$Rej=(1-Cb/Ca)\times 100$$

wherein Ca was the polystyrene latex concentration (ppm) in the supplied water and Cb was that (ppm) in the permeated water.

(5) Tensile Strength and Elongation of Hollow Fiber Membrane

Swollen membranes with a length of 50 mm were drawn at a crosshead speed of 50 mm/min under a full-scale weight of 2,000 g using a tensilometer to determine the tensile strength and elongation at break of each membrane.

Examples 1 to 5 and Comparative Examples 1 to 4

Vinylidene fluoride homopolymer was used as the polymer according to the present invention, cyclohexanone was used as the poor solvent, and an aqueous cyclohexanone solution was used as the hollow section-forming liquid, and the cooling bath. In accordance with Table 1, each polymer having a prescribed weight average molecular weight was dissolved into the poor solvent at a given temperature to prepare a polymer solution having a polymer concentration shown in Table 1. While a hollow section-forming liquid containing a prescribed amount of poor solvent at a prescribed temperature was being discharged into the hollow section of the inner tube of a spinneret, the polymer solution was discharged from the spinneret at a prescribed temperature into a cooling bath containing a prescribed amount of poor solvent and maintained at a prescribed temperature to coagulate the polymer. The properties of the resulting hollow fiber membranes are shown in Table 1. In COMPARATIVE EXAMPLE 1, no hollow fiber membrane was formed because of significantly low viscosity of the polymer solutions discharged from the spinneret.

In COMPARATIVE EXAMPLE 2, no hollow fiber membrane was formed because of significantly high viscosity of the polymer solutions.

In COMPARATIVE EXAMPLE 3, the resulting hollow fiber membrane had no spherical structure and thus did not show permeability. The permeability after stretching was at most 0.2 m³/m²·hr at a differential pressure of 100 kPa and 25° C. Furthermore, the membrane was not able to be stretched uniformly and was easily broken during the drawing step.

In COMPARATIVE EXAMPLE 4, the polymer was dissolved for 12 hours, but no uniform solution was obtained. This solution was gelated when placed into a hopper of the spinning machine, and no hollow fiber membrane was obtained.

TABLE 1

| | M.W. of polymer (×10⁴) | Polymer conc. (wt %) | Dissolving temp. (° C.) | Spinneret temp. (° C.) | Cooling bath temp. (° C.) | Cooling bath conc. (wt %) | Hollow section-forming liquid conc. (wt %) | Outer diameter (mm) | Inner diameter (mm) | Permeability ($m^3/m^2 \cdot hr$) at 100 KPa, 25° C. | Tensile strength (g/fiber) | Elongation at break (%) |
|---|---|---|---|---|---|---|---|---|---|---|---|---|
| EX. 1 | 28.4 | 55 | 160 | 125 | 30 | 90 | 100 | 1.70 | 0.99 | 0.70 | 540 | 75 |
| EX. 2 | 35.8 | 50 | 160 | 120 | 25 | 85 | 100 | 1.63 | 1.00 | 0.91 | 720 | 68 |
| EX. 3 | 41.7 | 40 | 160 | 130 | 20 | 80 | 100 | 1.52 | 0.88 | 1.21 | 890 | 59 |
| EX. 4 | 41.7 | 20 | 140 | 95 | 10 | 80 | 95 | 1.44 | 0.92 | 1.35 | 420 | 63 |
| EX. 5 | 57.2 | 35 | 170 | 155 | 15 | 80 | 100 | 1.51 | 0.89 | 0.68 | 730 | 58 |
| CE. 1 | 41.7 | 18 | 90 | 90 | — | — | — | — | — | — | — | — |
| CE. 2 | 41.7 | 62 | 170 | 160 | — | — | 100 | — | — | — | — | — |
| CE. 3 | 41.7 | 40 | 185 | 180 | 30 | 80 | 100 | — | — | (0.20) | — | — |
| CE. 4 | 28.4 | 20 | 78 | — | — | — | — | — | — | — | — | — |

EX.: EXAMPLE,
CE.: COMPARATIVE EXAMPLE,
M.W.: weight average molecular weight,
conc.: concentration,
temp.: temperature,
wt %: percent by weight

Example 6

The hollow fiber membrane prepared in EXAMPLE 1 was drawn to 2.0 times in water at 88° C. The stretched hollow fiber membrane had an outer diameter of 1.55 mm, an inner diameter of 0.95 mm, a permeability of 1.9 $m^3/m^2 \times$ hr at a differential pressure of 100 kPa and 25° C., a tensile strength of 880 g/fiber, and an elongation at break of 55%.

Example 7

The hollow fiber membrane prepared in EXAMPLE 2 was drawn to 2.5 times in polyethylene glycol (molecular weight: 400) at 110° C. The stretched hollow fiber membrane had an outer diameter of 1.40 mm, an inner diameter of 0.90 mm, a permeability of 2.5 $m^3/m^2 \times hr$ at a differential pressure of 100 kPa and 25° C., a tensile strength of 1,250 g/fiber, and an elongation at break of 50%.

Example 8

The hollow fiber membrane prepared in EXAMPLE 3 was drawn to 3.0 times in water at 85° C. The stretched hollow fiber membrane had an outer diameter of 1.30 mm, an inner diameter of 0.75 mm, a permeability of 3.6 $m^3/m^2 \times$ hr at a differential pressure of 100 kPa and 25° C., a tensile strength of 1,720 g/fiber, and an elongation at break of 48%.

Example 9

The hollow fiber membrane prepared in EXAMPLE 4 was drawn to 3.5 times in water at 85° C. The stretched hollow fiber membrane had an outer diameter of 1.20 mm, an inner diameter of 0.70 mm, a permeability of 4.8 $m^3/m^2 \times$ hr at a differential pressure of 100 kPa and 25° C., a tensile strength of 610 g/fiber, and an elongation at break of 50%.

Example 10

The hollow fiber membrane prepared in EXAMPLE 5 was drawn to 4.0 times in water at 85° C. The stretched hollow fiber membrane had an outer diameter of 1.35 mm, an inner diameter of 0.80 mm, a permeability of 2.1 $m^3/m^2 \times$ hr at a differential pressure of 100 kPa and 25° C., a tensile strength of 1,380 g/fiber, and an elongation at break of 45%.

Example 11

Into 60 percent by weight of cyclohexane, 30 percent by weight of polyvinylidene fluoride homopolymer having a weight average molecular weight of 358,000 and 10 percent by weight of tetrafluoroethylene/vinylidene fluoride copolymer were dissolved at 165° C. The polymer solution was discharged from a spinneret at 145° C. while 100% cyclohexanone (hollow section-forming liquid) was being discharged into the hollow section of the inner tube of the spinneret, and was solidified in a cooling bath containing 90 percent by weight of cyclohexanone at 30° C. The fiber was drawn to 3.0 times in water at 80° C. The stretched hollow fiber membrane had an outer diameter of 1.40 mm, an inner diameter of 0.9 mm, a permeability of 1.5 $m^3/m^2 \times hr$ at a differential pressure of 100 kPa and 25° C., a tensile strength of 1,580 g/fiber, and an elongation at break of 55%.

Comparative Example 5

The hollow fiber membrane prepared in EXAMPLE 3 was drawn in water at 45° C., but broke at many portions. Furthermore, the successfully stretched portions showed leakage of matter that should have been collected.

Comparative Example 6

The hollow fiber membrane prepared in EXAMPLE 3 was drawn to 2.5 times in polyethylene glycol (molecular weight: 400) at 150° C. The stretched hollow fiber membrane had a low permeability of 0.5 $m^3/m^2 \times hr$ at a differential pressure of 100 kPa and 25° C. because of deformation caused by melting of the micropores.

Comparative Example 7

The hollow fiber membrane prepared in EXAMPLE 3 was drawn to 5.5 times in water at 85° C. The stretched hollow fiber membrane had an outer diameter of 1.05 mm, an inner diameter of 0.65 mm, a permeability of 0.8 m$^3$/m$^2$× hr at a differential pressure of 100 kPa and 25° C., a tensile strength of 1,860 g/fiber, and an elongation at break of 32%. The permeability was low because the micropores had a small diameter.

Examples 12 to 19 and Comparative Examples 8 to 12

Hollow fiber membranes were prepared as in EXAMPLE 1 except that γ-butyrolactone was used as the poor solvent and the preparation conditions were varied. The results are shown in Table 2.

In COMPARATIVE EXAMPLE 8, no hollow fiber membrane was formed because of significantly low viscosity of the polymer solutions discharged from the spinneret.

In COMPARATIVE EXAMPLE 9, no hollow fiber membrane was formed because of significantly high viscosity of the polymer solutions.

In COMPARATIVE EXAMPLE 10, the resulting hollow fiber membrane had no clear spherical structures and thus did not show high permeability. The permeability after stretching was at most 0.4 m$^3$/m$^2$·hr at a differential pressure of 100 kPa and 25° C.

In COMPARATIVE EXAMPLE 11, the polymer was dissolved for 12 hours as in COMPARATIVE EXAMPLE 4, but no uniform solution was obtained. This solution was gelated when placed into a hopper of the spinning machine, and no hollow fiber membrane was obtained.

In COMPARATIVE EXAMPLE 12, the resulting hollow fiber membrane did not show permeability and a dense layer was observed on the outer face.

Example 21

The hollow fiber membrane prepared in EXAMPLE 13 was drawn to 1.6 times in water at 80° C. The stretched hollow fiber membrane had an outer diameter of 1.16 mm, an inner diameter of 0.68 mm, a permeability of 3.4 m$^3$/m$^2$× hr at a differential pressure of 100 kPa and 25° C., a tensile strength of 690 g/fiber, and an elongation at break of 41%.

Example 22

The hollow fiber membrane prepared in EXAMPLE 14 was drawn to 1.7 times in water at 81° C. The stretched hollow fiber membrane had an outer diameter of 1.13 mm, an inner diameter of 0.81 mm, a permeability of 1.7 m$^3$/m$^2$× hr at a differential pressure of 100 kPa and 25° C., a tensile strength of 730 g/fiber, and an elongation at break of 189%.

Example 23

The hollow fiber membrane prepared in EXAMPLE 15 was drawn to 1.5 times in water at 80° C. The stretched hollow fiber membrane had an outer diameter of 1.43 mm, an inner diameter of 1.07 mm, a permeability of 10.0 m$^3$/m$^2$×hr at a differential pressure of 100 kPa and 25° C., a tensile strength of 520 g/fiber, and an elongation at break of 46%.

Example 24

The hollow fiber membrane prepared in EXAMPLE 16 was drawn to 1.9 times in water at 87° C. The stretched

TABLE 2

| | M.W. of polymer (×10$^4$) | Polymer conc. (wt %) | Dissolving temp. (° C.) | Spinneret temp. (° C.) | Cooling bath temp. (° C.) | Cooling bath conc. (wt %) | Hollow section-forming liquid conc. (wt %) | Outer diameter (mm) | Inner diameter (mm) | Permeability (m$^3$/m$^2$ · hr) at 100 KPa, 25° C. | Tensile strength (g/fiber) | Elongation at break (%) |
|---|---|---|---|---|---|---|---|---|---|---|---|---|
| EX. 12 | 41.7 | 40 | 170 | 100 | 27 | 80 | 100 | 1.28 | 0.78 | 0.48 | 400 | 60 |
| EX. 13 | 41.7 | 45 | 170 | 120 | 27 | 80 | 100 | 1.22 | 0.74 | 0.68 | 480 | 59 |
| EX. 14 | 41.7 | 38 | 170 | 95 | 28 | 80 | 100 | 1.33 | 0.99 | 1.36 | 510 | 243 |
| EX. 15 | 41.7 | 43 | 170 | 110 | 28 | 80 | 100 | 1.49 | 1.15 | 8.22 | 380 | 70 |
| EX. 16 | 41.7 | 50 | 170 | 140 | 27 | 80 | 100 | 1.86 | 1.14 | 1.40 | 620 | 80 |
| EX. 17 | 41.7 | 38 | 170 | 100 | 8.5 | 80 | 100 | 1.40 | 0.85 | 0.89 | 760 | 63 |
| EX. 18 | 35.8 | 50 | 170 | 113 | 27 | 80 | 100 | 1.34 | 0.93 | 1.07 | 890 | 75 |
| EX. 19 | 41.7 | 38 | 150 | 100 | 5.5 | 85 | 85 | 1.35 | 0.85 | 0.41 | 1,020 | 200 |
| CE. 8 | 41.7 | 18 | 90 | 80 | — | — | 90 | — | — | — | — | — |
| CE. 9 | 41.7 | 65 | 170 | — | — | — | — | — | — | — | — | — |
| CE. 10 | 41.7 | 40 | 185 | 180 | 30 | 80 | 100 | — | — | — | — | — |
| CE. 11 | 28.4 | 20 | 78 | — | — | — | — | — | — | — | — | — |
| CE. 12 | 41.7 | 40 | 170 | 100 | 27 | 55 | 100 | — | — | 0 | — | — |

EX.: EXAMPLE,
CE.: COMPARATIVE EXAMPLE,
M.W.: weight average molecular weight,
conc.: concentration,
temp.: temperature,
wt %: percent by weight

Example 20

The hollow fiber membrane prepared in EXAMPLE 12 was drawn to 2.2 times in water at 80° C. The stretched hollow fiber membrane had an outer diameter of 1.07 mm, an inner diameter of 0.64 mm, a permeability of 1.7 m$^3$/m$^2$× hr at a differential pressure of 100 kPa and 25° C., a tensile strength of 520 g/fiber, and an elongation at break of 46%.

hollow fiber membrane had an outer diameter of 1.49 mm, an inner diameter of 0.93 mm, a permeability of 2.7 m$^3$/m$^2$× hr at a differential pressure of 100 kPa and 25° C., a tensile strength of 820 g/fiber, and an elongation at break of 56%.

Example 25

The hollow fiber membrane prepared in EXAMPLE 19 was drawn to 1.5 times in water at 87° C. The stretched hollow fiber membrane had an outer diameter of 1.31 mm, an inner diameter of 0.79 mm, a permeability of 2.6 m³/m²×hr at a differential pressure of 100 kPa and 25° C., a tensile strength of 1,020 g/fiber, and an elongation at break of 130%.

Comparative Example 13

The hollow fiber membrane prepared in EXAMPLE 12 was drawn in water at 45° C. The membrane broke at many portions during the drawing step. The successfully stretched portions of the hollow fiber membrane did not show high permeability.

Comparative Example 14

The hollow fiber membrane prepared in EXAMPLE 12 was drawn to 3.0 times in polyethylene glycol (molecular weight: 400) at 150° C. The stretched hollow fiber membrane had a low permeability of 0.3 m³/m²×hr at a differential pressure of 100 kPa and 25° C. because of deformation caused by melting of the micropores.

Comparative Example 15

The hollow fiber membrane prepared in EXAMPLE 12 was drawn to 5.5 times in water at 85° C. The stretched hollow fiber membrane had an outer diameter of 1.00 mm, an inner diameter of 0.60 mm, a permeability of 0.29 m³/m²×hr at a differential pressure of 100 kPa and 25° C., a tensile strength of 1,560 g/fiber, and an elongation at break of 29%. The permeability was low because the micropores had a small diameter.

Example 26

Into 60 percent by weight of isophorone, 40 percent by weight of polyvinylidene fluoride homopolymer having a weight average molecular weight of 417,000 was dissolved at 155° C. The polymer solution was discharged from a spinneret at 100° C. while 100% isophorone (hollow section-forming liquid) was being discharged into the hollow section of the inner tube of the spinneret, and was solidified in a cooling bath containing 80 percent by weight of isophorone at 30° C. The fiber was drawn to 3.0 times in water at 80° C. The stretched hollow fiber membrane had an outer diameter of 1.40 mm, an inner diameter of 0.90 mm, a permeability of 2.8 m³/m²×hr at a differential pressure of 100 kPa and 25° C., a tensile strength of 1,010 g/fiber, and an elongation at break of 54%.

Example 27

Into 60 percent by weight of dimethyl phthalate, 40 percent by weight of polyvinylidene fluoride homopolymer having a weight average molecular weight of 417,000 was dissolved at 165° C. The polymer solution was discharged from a spinneret at 110° C. while a hollow section-forming liquid of 60 percent by weight of dimethyl phthalate and 40 percent by weight of ethylene glycol (molecular weight: 400) was being discharged into the hollow section of the inner tube of the spinneret, and was solidified in a cooling bath containing 60 percent by weight of dimethyl phthalate and 40 percent by weight of ethylene glycol (molecular weight: 400) at 40° C. The fiber was drawn to 3.0 times in ethylene glycol (molecular weight: 400) at 120° C. The stretched hollow fiber membrane had an outer diameter of 1.35 mm, an inner diameter of 0.75 mm, a permeability of 1.8 m³/m²×hr at a differential pressure of 100 kPa and 25° C., a tensile strength of 1,410 g/fiber, and an elongation at break of 38%.

Example 28

Into 60 percent by weight of γ-butyrolactone, 40 percent by weight of polyvinylidene fluoride homopolymer having a weight average molecular weight of 417,000 was dissolved at 150° C. to prepare a homogeneous solution. The solution had a crystallization temperature Tc of 57° C. Thus, the preferable discharge temperature lies within the range 57° C.≦Ts≦147° C. The polymer solution was allowed to stand at 110° C. for defoaming and was discharged at 100° C. (spinneret temperature Ts) from the outer pipe of a double pipe spinneret, while 100 percent by weight of γ-butyrolactone was being supplied into the hollow section from the inner tube of the double pipe spinneret. The solution was discharged into a cooling bath at 5° C. having a distance between the spinneret surface and the cooling bath surface of 4 cm and containing 0.80 percent by weight of γ-butyrolactone and 20 percent by weight of water at an extruding rate of 6.0 m/min and an average cooling rate of 14,250° C./min to allow the solution to gelate in the cooling bath. The resultant extrudate was drawn to 1.5 times in a hot water bath at 80° C. to prepare a hollow fiber membrane.

The properties of the hollow fiber membrane are shown in Table 4. The hollow fiber membrane was excellent in mechanical strength, permeability, and separability. The membrane had a structure of integrated spherulites having a particle size of 1.8 μm with pores extending between the spherulites.

Example 29

Into 67 percent by weight of γ-butyrolactone, 33 percent by weight of polyvinylidene fluoride homopolymer having a weight average molecular weight of 417,000 was dissolved at 120° C. to prepare a homogeneous solution. The solution had a crystallization temperature Tc of 41° C. Thus, the preferable discharge temperature lies within the range 41° C.≦Ts≦131° C. A hollow fiber membrane was prepared as in EXAMPLE 1 according to conditions shown in Table 3. A liquid mixture of 90 percent by weight of γ-butyrolactone and 10 percent by weight of water was supplied into the hollow section. The properties of the hollow fiber membrane are shown in Table 4. The hollow fiber membrane was excellent in permeability and separability. The membrane had a structure of integrated spherulites having a particle size of 3.2 μm with pores extending between the spherulites.

Example 30

Into 45 percent by weight of propylene carbonate, 55 percent by weight of polyvinylidene fluoride homopolymer having a weight average molecular weight (Mw) of 358,000 was dissolved at 170° C. to prepare a homogeneous solution. The solution had a crystallization temperature Tc of 78° C. Thus, the preferable discharge temperature lies within the range 78° C.≦Ts≦168° C. A hollow fiber membrane was prepared as in EXAMPLE 1 according to conditions shown in Table 3, wherein propylene carbonate was supplied into the hollow section and was also used in the cooling bath. The properties of the hollow fiber membrane are shown in Table 4. The hollow fiber membrane was excellent in mechanical strength, permeability, and separability. The membrane had a structure of integrated spherulites having a particle size of 1.9 μm with pores extending between the spherulites.

Example 31

Into 45 percent by weight of propylene carbonate, 55 percent by weight of polyvinylidene fluoride homopolymer having a weight average molecular weight (Mw) of 417,000 was dissolved at 170° C. to prepare a homogeneous solution. The solution had a crystallization temperature Tc of 79° C. Thus, the preferable discharge temperature lies within the range 79° C.≦Ts≦179° C. A hollow fiber membrane was prepared as in EXAMPLE 3 according to conditions shown in Table 3. The thermographic results showed that the hollow fiber was cooled to 79° C. or less at a position 3 cm below the spinneret, and the calculated average cooling rate Vt in the membrane-forming step according to method (a) was 3,500° C./min.

The properties of the hollow fiber membrane are shown in Table 4. The hollow fiber membrane was excellent in permeability and separability. The membrane had a structure of integrated spherulites having a particle size of 2.2 μm with pores extending between the spherulites.

Comparative Example 16

Into 65 percent by weight of γ-butyrolactone, 35 percent by weight of polyvinylidene fluoride homopolymer having a weight average molecular weight of 444,000 was dissolved at 130° C. to prepare a homogeneous solution. The solution had a crystallization temperature Tc of 47° C. Thus, the preferable discharge temperature lies within the range 47° C.≦Ts≦137° C. A hollow fiber membrane was prepared as in COMPARATIVE EXAMPLE 28 according to conditions shown in Table 3. The results are shown in Table 4. The hollow fiber membrane showed a small rejection of 33% to uniform polystyrene latex particles having a diameter of 0.309 μm. The membrane had a structure of integrated spherulites having a particle size of 4.3 μm with pores extending between the spherulites. A small average cooling rate is assumed to increase the particle size of the spherulites and thus to decrease the filterability due to an increased pore size.

Comparative Example 17

Discharge of the polymer solution prepared in EXAMPLE 28 was tried at a spinneret temperature Ts of 50° C., which was below the crystallization temperature Tc; however, the solution could not be discharged because of solidification of the polymer in the spinneret.

Comparative Example 18

A hollow fiber membrane was prepared as in EXAMPLE 28 except that the spinneret temperature Ts was 150° C. The properties of the hollow fiber membrane are shown in Table 4. The hollow fiber membrane showed a small rejection of 44% to uniform polystyrene latex particles having a diameter of 0.309 μm. The membrane had a structure of integrated spherulites having a particle size of 5.1 μm with pores extending between the spherulites.

Comparative Example 19

Into 75 percent by weight of γ-butyrolactone, 25 percent by weight of polyvinylidene fluoride homopolymer having a weight average molecular weight of 444,000 was dissolved at 130° C. to prepare a homogeneous solution. The solution had a low crystallization temperature Tc of 31° C. A hollow fiber membrane was prepared as in COMPARATIVE EXAMPLE 28 according to conditions shown in Table 3. The properties of the hollow fiber membrane are shown in Table 4. The hollow fiber membrane showed a small rejection of 40% to uniform polystyrene latex particles having a diameter of 0.309 μm. The membrane had a structure of integrated spherulites having a particle size of 4.3 μm with pores extending between the spherulites.

Comparative Example 20

Into 78 percent by weight of γ-butyrolactone, 22 percent by weight of polyvinylidene fluoride homopolymer having a weight average molecular weight of 444,000 was dissolved at 145° C. to prepare a homogeneous solution. The solution had a high crystallization temperature Tc of 121° C. The polymer solution was allowed to stand at 145° C. for defoaming. A hollow fiber membrane was prepared as in COMPARATIVE EXAMPLE 28 according to conditions shown in Table 3. The properties of the hollow fiber membrane are shown in Table 4. The hollow fiber membrane showed no water permeability (0 m³/m²×hr at a differential pressure of 100 kPa and 25° C.).

TABLE 3

| | Polymer solution | | Poor solvent | Cooling bath | | | Dry | Extruding | Average | |
|---|---|---|---|---|---|---|---|---|---|---|
| | Polymer conc. (wt %) | Tc (° C.) | content in injected liquid (wt %) | Poor solvent content (wt %) | Temp. (° C.) | Ts (° C.) | distance (cm) | rate (m/min) | cooling temp. (° C.) | Drawing (times) |
| EX. 28 | 40 | 57 | 100 | 80 | 5 | 100 | 4 | 6.0 | 14,250 | 1.5 |
| EX. 29 | 33 | 41 | 90 | 80 | 30 | 100 | 5 | 7.0 | 7,000 | Not drawn |
| EX. 30 | 55 | 78 | 100 | 85 | 5 | 160 | 0.5 | 15.0 | 46,500 | 1.8 |
| EX. 31 | 55 | 79 | 100 | 70 | 15 | 100 | 30 | 5.0 | 3,500 | 1.5 |
| CE. 16 | 35 | 47 | 100 | 80 | 40 | 80 | 10 | 4.0 | 1,600 | 1.5 |
| CE. 17 | 40 | 57 | 100 | 80 | 5 | 50 | — | — | — | — |
| CE. 18 | 40 | 57 | 100 | 80 | 5 | 150 | 4 | 6.0 | 21,750 | 1.5 |
| CE. 19 | 25 | 31 | 100 | 80 | 5 | 80 | 4 | 6.0 | 11,250 | 1.5 |
| CE. 20 | 78 | 121 | 100 | 80 | 40 | 145 | 4 | 6.0 | 15,750 | 1.5 | wt %: weight percent,
temp.: temperature,
dry distance: distance between the spinneret surface and the cooling bath surface

TABLE 4

| | Inner diameter (mm) | Outer diameter (mm) | Tensile strength (g/fiber) | Elongation at break (%) | Permeability ($m^3/m^2 \cdot h \cdot kPa$) | Rejection to polystyrene latex (%) |
|---|---|---|---|---|---|---|
| EXAMPLE 28 | 0.82 | 1.35 | 1,780 | 85 | 3.1 | 85 |
| EXAMPLE 29 | 0.75 | 1.20 | — | — | 4.5 | 78 |
| EXAMPLE 30 | 0.78 | 1.37 | 2,060 | 75 | 1.9 | 82 |
| EXAMPLE 31 | 0.88 | 1.45 | — | — | 1.3 | 95 |
| COMPARATIVE EXAMPLE 16 | 0.69 | 1.29 | 680 | 72 | 4.5 | 33 |
| COMPARATIVE EXAMPLE 17 | — | — | — | — | — | — |
| COMPARATIVE EXAMPLE 18 | 0.63 | 1.23 | 1,150 | 83 | 3.8 | 44 |
| COMPARATIVE EXAMPLE 19 | 0.69 | 1.29 | 680 | 72 | 4.2 | 40 |
| COMPARATIVE EXAMPLE 20 | 0.73 | 1.42 | — | — | 0 | — |

Example 32

The hollow fiber membrane prepared in EXAMPLE 25 was immersed into an aqueous 50 weight percent ethanol solution and then into reverse osmosis (RO) water. The hollow fiber membrane was allowed to stand in an aqueous 0.0.01-N sodium hydroxide solution at 30° C. for 1 hour, then was washed with RO water. The membrane was allowed to stand in an aqueous 1.5 weight percent hydrogen peroxide solution at 30° C. for 1 hour, and was washed with RO water.

The water permeability of the treated hollow fiber membrane increased to 3.2 $m^3/m^2 \times hr$ at a differential pressure of 100 kPa and 25° C. The tensile strength was 1,100 g/fiber and the elongation at break was 125%.

Example 33

The hollow fiber membrane prepared in EXAMPLE 25 was immersed into an aqueous 50 weight percent ethanol solution and then into RO water. The hollow fiber membrane was allowed to stand in an aqueous 0.01-N sodium hydroxide solution at 30° C. for 1 hour, then was washed with RO water. The membrane was allowed to stand in water containing 10-ppm ozone 100 hour. The water permeability of the treated hollow fiber membrane increased to 3.5 $m^3/m^2 \times hr$ at a differential pressure of 100 kpa and 25° C. The tensile strength was 1,000 g/fiber and the elongation at break was 110%.

Example 34

The hollow fiber membrane prepared in EXAMPLE 25 was immersed into an 10 weight percent N—N,-dimethyl-1,3-propanediamine in ethanol solution at 30° C. for 1 hour. The water permeability of the treated hollow fiber membrane significantly increased to 4.1 $m^3/m^2 \times hr$ at a differential pressure of 100 kPa and 25° C. The tensile strength was 1,300 g/fiber and the elongation at break was 75%.

Example 35

Figure 5:
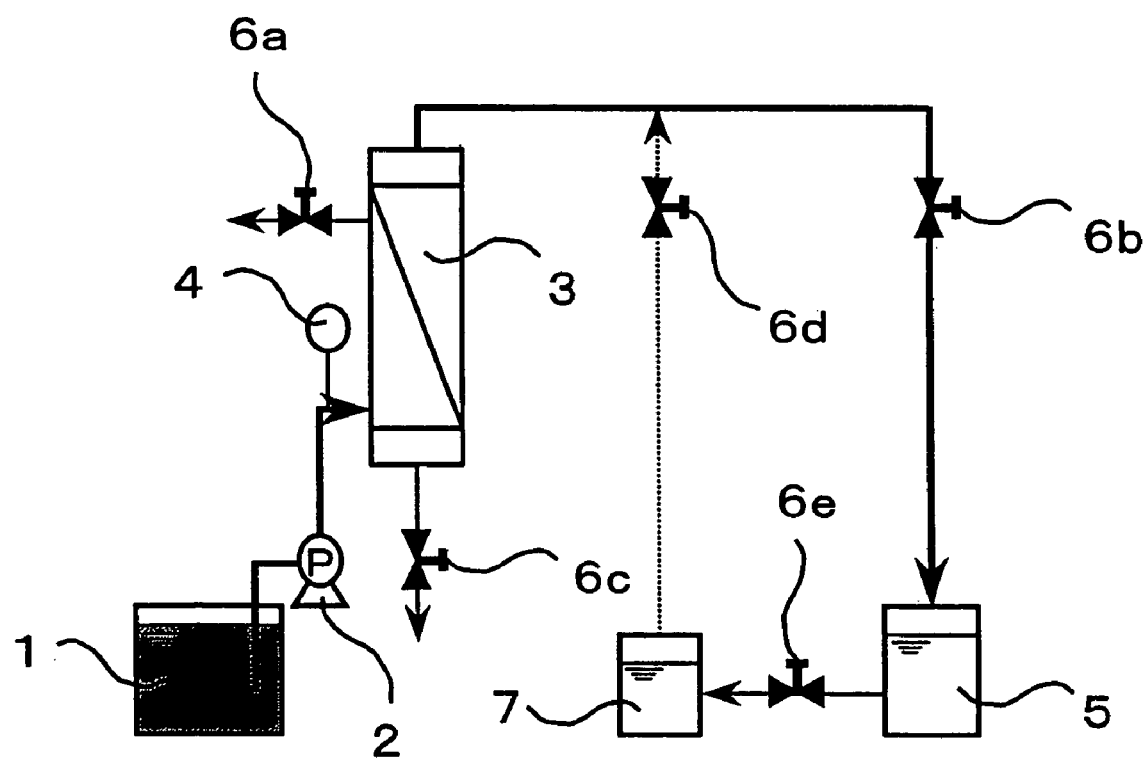
FIG. 5 is a schematic diagram of a membrane separation apparatus.

Using a pressured hollow fiber microfiltration membrane that included bundled hollow fiber membranes prepared in EXAMPLE 32 and had a length of about 50 cm and an effective membrane area of 0.5 $mm^2$, Lake Biwa water was filtered by dead end filtration at a constant flow rate. FIG. 5 is a schematic diagram of a membrane separation apparatus used. Lake Biwa water during the filtration operation had an average turbidity of 6.8 NTU and an average TOC of 2.3 mg/l.

In the filtration operation, raw water was supplied into a separation membrane module 3 by a pressurizing pump 2, then an electromagnetic valve 6a was closed to reserve the raw water in a treated water reservoir 5. The membrane permeation rate (F) was set to be 2 $m^3/m^2 \cdot d$. For physical washing, 1-minute back washing and 1-minute air scrubbing were performed for 1-minute for every 30-minute operation. In the back washing, back washing water that was supplied from the treated water reservoir 7 through an electromagnetic valve 6e was allowed to flow from the treated water face to the raw water face of the separation membrane module 3 through an electromagnetic valve 6d and to flow out through the electromagnetic valve 6a. A sodium hypochlorite solution at a concentration of 5 mg/l (0.07 times the average TOC of the raw water) was added to the back washing water. In the air scrubbing washing, air was introduced from the bottom of the separation membrane module 3 to vibrate the hollow fiber membrane. After this operation, an electromagnetic valve 6c was opened to drain dirty water in the separation membrane module 3. An electromagnetic valve 6b was closed during the physical washing operation. The filtration differential pressure after 1,000-hour operation was about 60 kPa, which was a low level.

Comparative Example 21

A filtration operation was performed at the same time as in EXAMPLE 35 except that the hollow fiber membrane prepared in EXAMPLE 25 was used. The filtration differential pressure after 1,000-hour operation was about 95 kPa, which was higher than that in EXAMPLE 35 and was a disadvantageous level in view of operation stability and cost.

Comparative Example 22

A filtration operation was performed at the same time as in EXAMPLE 35 except that no sodium hypochlorite was added. The filtration differential pressure reached 100 kPa in a day, and the apparatus was not able to continue the operation.

What is claimed is:

1. A hollow fiber membrane consisting essentially of a polyvinylidene fluoride resin; the membrane made by the process of discharging a solution of polyvinylidene fluoride of average molecular weight about 358,000–417,000 in y-butyrolactone or propylene carbonate at a temperature above the phase separation into a cooling bath below the pahse separation temperature; the membrane having spherical structures that have an average diameter in the range of 1.8 to 3.2 μm, wherein the hollow fiber membrane has a water permeability in the range of 1.3 to 4.5 m$^3$/m$^2$hr at 100 kPa and 25° C., a tensile strength in the range of 1.8 to 2.1 kg per fiber, an elongation at break in the range of 75% to 85%, and a rejection of polystyrene latex having a particle size of 0.309 μm of 78% –95% or more.

2. The hollow fiber membrane according to claim 1, having spherical structures at a density in the range of $10^3$/mm$^2$ to $10^8$/mm$^2$ in the interior.

3. The hollow fiber membrane according to claim 1, having a porosity in the range of 40% to 75%.

4. A hollow fiber membrane module comprising the hollow fiber membrane according to claim 1.

5. A water separator comprising the hollow fiber membrane module according to claim 4.

6. A method of producing permeated water from raw water using the water separator according to claim 5.

7. A method of producing a hollow fiber membrane as set forth in claim 1, comprising:
discharging a polyvinylidene fluoride solution comprising a polyvinylidene fluoride resin and a poor solvent at a temperature above a phase separation temperature into a cooling bath at a temperature below the phase separation temperature to coagulate the polyvinylidene fluoride resin;
wherein the coagulated polyvinylidene fluoride resin has a draw ratio in the range of 1.1 to 5 times at a temperature in the range of 500° C. to 1400° C.

8. The method according to claim 7, wherein the crystallization temperature of the polyvinylidene fluoride solution is in the range of 40° C. to 120° C., the average cooling rate of the polyvinylidene fluoride solution when the temperature of the polyvinylidene fluoride solution reaches the crystallization temperature during cooling is in the range of $2 \times 10^{3}$° C./mm to $10^{6}$° C./mm, and the temperature Ts of a spinneret for discharging the polyvinylidene fluoride solution into the cooling bath and the crystallization temperature Tc satisfy the relationship Tc≦Ts≦Tc+90.

9. The method according to claim 7, wherein the polyvinylidene fluoride solution contains at least 20 to 60 percent by weight of the polyvinylidene fluoride resin.

10. The method according to claim 7, wherein the polyvinylidene fluoride solution has a phase separation temperature in the range of 80° to 220° C.

11. The method according to claim 7, wherein the cooling bath contains 60 to 100 percent by weight of a poor solvent.

12. The method according to claim 7, wherein the hollow section of the hollow fiber membrane is formed by using a hollow section-forming liquid containing 60 to 100 percent by weight of a poor solvent.

* * * * *

UNITED STATES PATENT AND TRADEMARK OFFICE
CERTIFICATE OF CORRECTION

PATENT NO.         : 7,182,870 B2  
APPLICATION NO. : 11/155602  
DATED                 : February 27, 2007  
INVENTOR(S)       : Shin-ichi Minegishi et al.

It is certified that error appears in the above-identified patent and that said Letters Patent is hereby corrected as shown below:

In Claim 1, column 25, line 8, delete "pahse" and replace with --phase--.

In Claim 1, column 25, line 15, delete the phrase "or more."

In Claim 7, column 26, line 6, delete "500°C. to 1400°C." and replace with --50°C to 140°C.--.

In Claim 8, column 26, line 13, delete "C./mm to $10^{6°}$ C./mm" and replace with --C/min to $10^{6°}$ C/min--.

Signed and Sealed this

Twenty-ninth Day of May, 2007

JON W. DUDAS  
*Director of the United States Patent and Trademark Office*